ID Patent Number: 4,532,164
Date of Patent: Jul. 30, 1985

United States Patent [19]
Claunch, II et al.

[54] HEAT-SHRINKABLE ARTICLE

[75] Inventors: Carney P. Claunch, II, Redwood City; Thomas A. Kridl; Jose P. Gamarra, both of Union City, all of Calif.

[73] Assignee: Raychem Corporation, Menlo Park, Calif.

[21] Appl. No.: 532,329

[22] Filed: Sep. 15, 1983

[51] Int. Cl.³ .................................................. H05B 3/58
[52] U.S. Cl. .................................. 428/36; 174/DIG. 8; 156/49; 219/535; 219/549
[58] Field of Search .................... 174/DIG. 8; 428/36; 219/535, 549; 156/49

[56] References Cited

U.S. PATENT DOCUMENTS

| | | | |
|---|---|---|---|
| 3,451,609 | 6/1969 | Gillett | 174/DIG. 8 |
| 3,879,574 | 4/1975 | Filreis et al. | 174/76 |
| 3,964,945 | 6/1976 | Everhart et al. | 156/52 |
| 4,025,717 | 5/1977 | Whittingham | 174/84 R |
| 4,029,895 | 6/1977 | Scarborough | 174/84 R |
| 4,142,592 | 3/1979 | Brusselmans | 174/DIG. 8 |
| 4,177,446 | 12/1979 | Diaz | 219/549 |
| 4,194,082 | 3/1980 | Campbell | 174/DIG. 8 |
| 4,223,209 | 9/1980 | Diaz | 219/549 |
| 4,226,903 | 10/1980 | Gottung et al. | 428/195 |
| 4,283,239 | 8/1981 | Corke et al. | 174/DIG. 8 |
| 4,283,596 | 8/1981 | Vidakovits et al. | 174/DIG. 8 |
| 4,318,220 | 3/1982 | Diaz | 29/611 |
| 4,323,607 | 4/1982 | Nishimura et al. | 174/DIG. 8 |
| 4,369,356 | 1/1983 | Tsuratani et al. | 174/DIG. 8 |
| 4,412,125 | 10/1983 | Nagasawa et al. | 174/DIG. 8 |
| 4,419,156 | 12/1983 | Diaz et al. | 156/49 |

*Primary Examiner*—John E. Kittle
*Assistant Examiner*—James J. Seidleck
*Attorney, Agent, or Firm*—Dennis E. Kovach; T. Gene Dillahunty

[57] ABSTRACT

A heat-shrinkable article comprising (1) a heat-shrinkable layer of polymeric material, (2) a laminar heater which comprises a conductive polymer layer sandwiched between apertured metal electrodes and which is secured to the inner surface of the layer, and (3) a member which is secured to the inside of the heater and which protects a substrate from damage caused by the heater when the layer shrinks. The protective member (3) has a first shape before the layer shrinks and a second shape after the layer shrinks. The member possesses sufficient strength to resist piercing by the electrodes when the layer shrinks. Such articles are particularly useful for enclosing splices in telephone cables.

20 Claims, 7 Drawing Figures

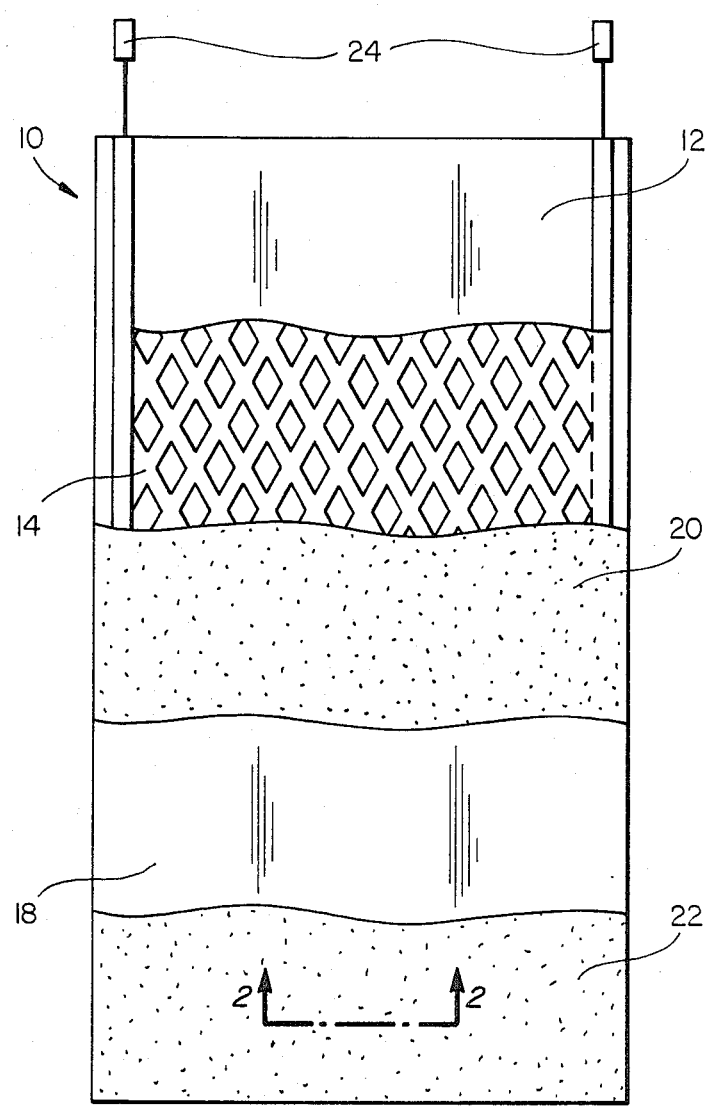
FIG_1
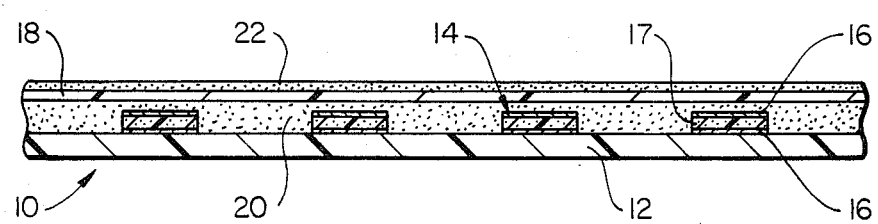
FIG_2

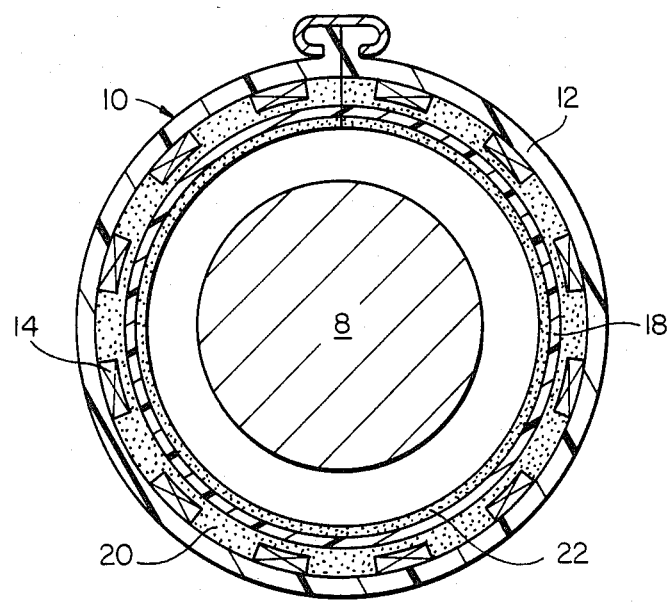
FIG_3A
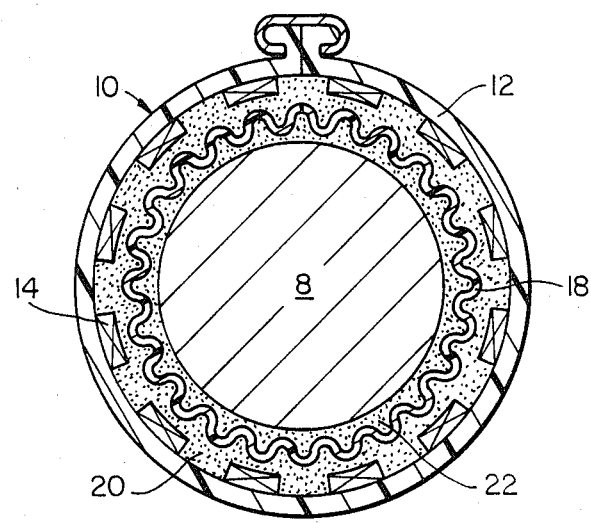
FIG_3B

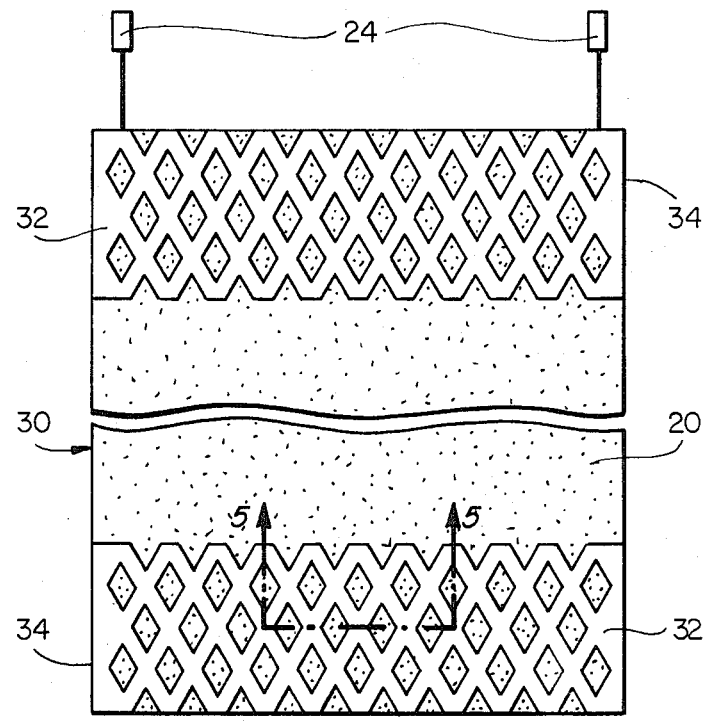
*FIG_4*
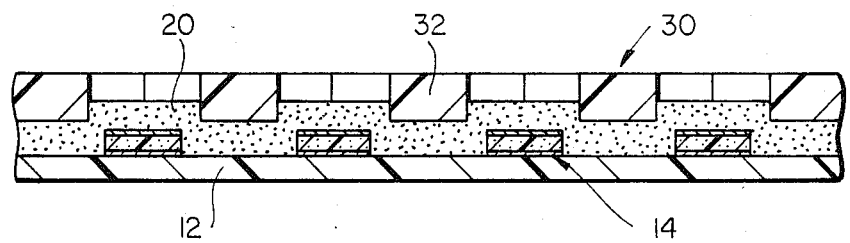
*FIG_5*
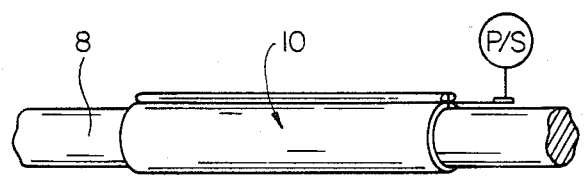
*FIG_6*

HEAT-SHRINKABLE ARTICLE

BACKGROUND OF THE INVENTION

1. Field of the Invention

This invention relates to heat-shrinkable articles comprising laminar electrical heaters.

2. Introduction to the Invention

Laminar electrical heaters, including those which comprise a laminar resistive heating element composed of a conductive polymer, are known. Some of these heaters comprise a pair of laminar electrodes, e.g. of metal foil or pierced metal sheet, with the heating element sandwiched between them. The heating element preferably exhibits PTC behavior, thus rendering the heater self-regulating. It is also known to make such heaters which are heat-recoverable or which are deformable so that they can be attached to heat-recoverable articles and will not prevent heat-recovery thereof. Reference may be made for example to U.S. Pat. Nos. 4,085,286, 4,177,376, 4,177,446, 4,223,209, and 4,318,220, and copending and commonly assigned patent application Ser. Nos. 818,711 and 254,352, published as European Applicaion No. 63,440, and the copending and commonly assigned patent application filed on May 11, 1983 by Chazan et al Ser. No. 493,445. For further details concerning conductive polymers and electrical devices concerning them, reference may be made to U.S. Pat. Nos. 2,952,761, 2,978,665, 3,243,753, 3,351,882, 3,571,777, 3,757,086, 3,793,716, 3,823,217, 3,858,144, 3,861,029, 4,017,715, 4,072,848, 4,117,312, 4,177,446, 4,188,276, 4,237,441, 4,242,573, 4,246,468, 4,250,400, 4,255,698, 4,271,350, 4,272,471, 4,304,987, 4,309,596, 4,309,597, 4,314,230, 4,315,237, 4,317,027, 4,318,881 and 4,330,704; J. Applied Polymer Science 19, 813–815 (1975), Klason and Kubat; Polymer Engineering and Science 18, 649–653 (1978), Narkis et al; and commonly assigned U.S. Ser. Nos. 601,424 (Moyer), now abandoned, published as German OLS No. 2,634,999; 750,149 (Kamath et al.) now abandoned, published as German OLS No. 2,755,077; 732,792 (Van Konynenburg et al), now abandoned, published as German OLS No. 2,746,602; 798,154 (Horsma et al), now abandoned, published as German OLS No. 2,821,799; 134,354 (Lutz); 141,984 (Gotcher et al.), published as European Application No. 38718; 141,987 (Middleman et al.), published as European Application No. 38715, 141,988 (Fouts et al.), also published as European Application No. 38718, 141,989 (Evans), published as European Application No. 38713, 141,991 (Fouts et al.), published as European Application No. 38714, 142,053 (Middleman et al.), published as Europenan Application No. 38716, 150,909 (Sopory) and 150,910 (Sopory), published as UK Application No. 2076106 A, 184,647 (Lutz), 250,491 (Jacobs et al.) 273,525 (Walty), 274,010 (Walty et al.), 272,854 (Stewart et al.), 300,709 (van Konynenburg et al.), 369,309 (Midgley et al.), 380,400 (Kamath) and 418,354 (Gurevich). The disclosure of each of the patents, publications and applications referred to above is incorporated herein by reference.

SUMMARY OF THE INVENTION

In making use of laminar heaters comprising a conductive polymer layer sandwiched between apertured metal electrodes, the heater being itself heat-shrinkable and/or being secured to the inside of a heat-shrinkable polymeric sheet, it has been found that the electrodes can damage a substrate against which the heater is recovered. For example, if the heater forms part of a telephone splice case which is shrunk around a cable having an insulating jacket which melts and flows at a relatively low temperature (e.g. a jacket of uncrosslinked polyethylene), the inner electrode can break and pierce through the insulating jacket, shorting out the individual telephone wires.

It has now been discovered that the danger of damaging the substrate can be substantially eliminated by placing a protective member between the substrate and the heater. In one aspect, the present invention provides a heat-shrinkable article comprising:

(1) a heat-shrinkable layer of polymeric material;

(2) a laminar heater which comprises:
  (a) two laminar apertured metal electrodes, one of the electrodes being on the inside of the article when it shrinks; and
  (b) a conductive polymer heating element between the electrodes; and (3) a member for protecting a substrate from the laminar heater upon shrinking of the article against the substrate, which member,
  (a) is secured to the inside of the heater,
  (b) has a first shape before the article shrinks,
  (c) is deformed to a second shape when the article shrinks, and
  (d) possesses sufficient strength to resist piercing by the metal electrodes when the article shrinks.

The conductive polymer heating element (b) can be heat-shrinkable and thus provide the heat-shrinkable layer (1) as well as the heating element (b). Preferably, however, the article comprises a continuous heat-shrinkable layer (1) of insulating polymeric material and a laminar heater as defined, secured to the inner surface of the heat-shrinkable layer.

In another aspect, the invention provides a method of protecting a substrate which comprises:

A. placing a heat-shrinkable article adjacent the substrate, the article comprising:
  (1) a heat-shrinkable layer of polymeric material; and
  (2) a laminar heater which comprises:
    (a) two laminar apertured metal electrodes, one of the electrodes being on the inside of the article when it shrinks; and
    (b) a conductive polymer heating element between the electrodes; and B. placing a member for protecting the substrate from the heater, between the heater and the substrate, which member,
  (a) has a first shape before the layer (1) shrinks
  (b) is deformed to a second shape when the layer (1) shrinks, and
  (c) possesses sufficient strength to resist piercing by the metal electrodes when the layer shrinks; and C. activating the heater, and thus shrinking the article by supplying electrical power to the electrodes.

Preferably, the article of this invention is an enclosure for enclosing a substrate, e.g. a cable splice, the enclosure comprising:

(1) a heat-shrinkable layer of polymeric material;

(2) a laminar heater which comprises:
  (a) two laminar apertured metal electrodes, one of the electrodes being on the inside of the article when it shrinks; and
  (b) a conductive polymer heating element between the electrodes; and (3) a member for protecting a substrate from the laminar heater upon shrinking of the article against the substrate, which member,
  (a) is made from thermally insulating material,
  (b) has a first generally uniform shape before the layer (1) shrinks,
  (c) is deformed to a second shape when the layer (1) shrinks,
  (d) possesses sufficient strength to resist piercing by the metal electrodes when the layer (1) shrinks, and
  (e) is secured to the inner side of the heater.

BRIEF DESCRIPTION OF THE DRAWING

FIG. 1 is a plan view of the inside of the heat-shrinkable article in accordance with this invention.

FIG. 2 is a section view of the heat-shrinkable article of FIG. 1 taken along line 2—2, looking in the direction of the arrows.

FIG. 3A and FIG. 3B are sectional views showing the article of FIG. 1 surrounding a substrate before and after recovery.

FIG. 4 is a plan view of another embodiment of a heat-shrinkable article in accordance with this invention.

FIG. 5 is a sectional view of the embodiment in FIG. 4 taken along line 5—5, looking in the direction of the arrows.

FIG. 6 illustrates the article after shrinking around a substrate.

DETAILED DESCRIPTION OF THE INVENTION

The heat-shrinkable article of the present invention includes a heat-shrinkable layer of polymeric material. Heat-shrinkable materials are well known. Examples and a more detailed explanation of such materials are set forth in Currie U.S. Pat. No. 2,027,962 (hereinafter Currie), and Cook et al U.S. Pat. No. 3,086,242 (hereinafter Cook et al), which are both incorporated herein by reference.

It is preferred that the polymeric layer be made from a cross-linked and expanded polymeric material. It is especially preferred that the polymer should comprise at least one crystalline polymer and be cross-linked by irradiation, e.g. to a dose of 5 to 30 Mrads, and should be expanded to 1.5 to 4 times its original dimension.

The heat-shrinkable article further includes a protective member for protecting a substrate on the inside of the article from damage upon the shrinking of the article. The protective member is secured to the inside of the heater and is capable of changing from a first shape before recovery to a second shape after recovery. Particularly, the shrinking of the article deforms the protective member from the first shape to the second shape. The protective member possesses sufficient strength to resist piercing by the metal electrodes when the article shrinks.

Preferably, the protective member is secured to the inside of the heater by a layer of hot melt adhesive. Particular hot melt adhesives that are effective include ethylene/vinyl acetate copolymers, ethylene/ethyl acrylate copolymers, ethylene/acrylic acid copolymers, polyamides and polyethylene, either alone or mixed with other ingredients, especially polyamide-based adhesive.

The protective member must maintain its integrity at the temperature at which the article shrinks. Preferably, the protective member is made from polymeric material which does not flow at the temperature at which the article shrinks, particularly a cross-linked material which softens but does not flow at the shrink temperature of the article. The polymeric material can be cross-linked by irradiation or chemically, for example as set forth in Currie, and Cook et al, supra.

When the member is deformed to its second shape, an irregular article generally results. It has been found that by present construction of a particular embodiment of an article in accordance with this invention that the protective member is deformed by the metal electrodes of the heater. Presently, the protective member has a first shape which is regular prior to shrinking of the layer and the first shape is changed to a second shape which is irregular after shrinking of the layer. It will be appreciated that the article could be made so that the protective member is deformed to a second shape which is regular after shrinking of the layer.

Preferably, the protective member is not heat-shrinkable. When the article shrinks, the protective member retains its overall dimensions but deforms to a second shape. The presently preferred second shape of the protective member is in the form of corrugations.

Also preferred is for the protective member to be made from a thermally insulating material. It is desirable in certain applications for the protective member to serve as a thermal insulation means for preventing the heat of the electrodes from damaging a substrate. A measure of such thermal insulation is $\alpha$. $\alpha$ stands for the thermal diffusivity of a material or the ability of a material to pass heat. A convenient way to find $\alpha$ is set forth in the equation as follows:

$$\alpha = K/(\rho C_p),$$

where K equals the thermal conductivity of the material, $\rho$ equals the density of material and $C_p$ equals the heat capacity of the material. $\alpha$ is preferably less than $20 \times 10^{-4}$ cm$^2$/sec.

It is preferred that a heat-shrinkable article in accordance with the invention be in the form of an enclosure. There are many forms of enclosures and it is especially preferred that the enclosure be a wraparound-type closure, e.g. as described in Ellis, U.S. Pat. No. 3,455,336, which is incorporated herein by reference.

Preferably, a second layer of heat-activatable adhesive is applied to the inside of the protective member. This layer serves as means for sealing any space between the substrate and the article after shrinking of the layer. This layer is preferably a hot melt adhesive such as those described above.

In an alternative embodiment, the protective member is in the form of an open mesh. The open mesh of the protective member allows heat-activatable adhesive to flow through the openings and is aided by the shrinking of the article. It is preferred that the open mesh be made from a thermally insulating material as described above. Cross-linked polyethylene and more especially, polypropylene are preferred.

The open mesh is similarly secured to the heater, preferably by a layer of heat-activatable adhesive. As the article shrinks the open mesh deforms to a second shape wherein the mesh is not as open as it was before the shrinking of the article. The mesh preferably has a thickness of at least twice the thickness of the electrodes. This relationship encourages a physical and thermal barrier for protecting a substrate.

The alternative protective member is especially advantageous when the article is a telephone cable splice enclosure. In that type of enclosure, the protective member may be in multiple parts, for instance two parts, with a first part secured to one end of the enclosure and a second part secured to the other end of the enclosure.

Referring to the drawing wherein like reference characters designate like or corresponding parts throughout the several views and referring particularly to FIGS. 1 and 2, there is shown a heat-shrinkable article in accordance with this invention, which is a heat-shrinkable enclosure, indicated generally by the numeral 10.

The enclosure 10 includes a heat-shrinkable layer of polymeric material 12. A laminar heater 14 is secured to the inner surface of the layer 12. The heater 14 is secured to the layer 12 with a cured polyurethane adhesive.

The heater 14 is made in accordance with the method for making the heater described in commonly assigned U.S. Pat. No. 4,177,446 which is incorporated herein by reference. The heater 14 includes two laminar metal electrodes 16, and a conductive polymer element 17 formed of layers of conductive polymer which is sandwiched between the two electrodes 16; the laminate 14 is slit to form apertures which accommodate expansion and shrinking of the layer 12. The apertured structure of heater 14 can be seen most clearly in FIG. 1.

The enclosure 10 includes a protective member 18 between a substrate, described more fully hereinafter, and the inside of the heater 14. The protective member 18 is located in the direction of shrinkage. The protective member 18 protects a substrate from damage when the layer 12 shrinks. The protective member 18 is secured to the heater 14 by a layer of hot melt adhesive 20. The hot melt adhesive illustrated is a polyamide.

The protective member 18 has a first generally uniform shape before shrinking of the layer 12. However, it will be appreciated that when the heater is made in accordance with Diaz '209, the lamination of the protective member 18 to it may result in its having a slightly corrugated shape.

The protective member 18 possesses sufficient strength to resist piercing by the metal electrodes 16 when the layer 12 shrinks. Additionally, the protective member 18 deforms to a second shape when the layer 12 shrinks for protecting a substrate from the heater 14 as will be described further with reference to FIG. 3.

The protective member 18 is non-flowable at the shrinking temperature of the layer 12. In other words, the protective member 18 retains its integrity at the temperature at which the layer 12 shrinks. However, the protective member 18 softens at this temperature and is flexible so that as a result of the shrinking forces of layer 12, it is deformed to a second shape. Without the shrinking forces of the layer 12, the protective member 18 will merely soften at the shrinking temperature and will not change shape. Particularly, the protective member 18 is made from an unexpanded, cross-linked EVA material and thus, the member 18 is not heat-shrinkable.

Hot melt adhesive layer 22 is applied to the protective member 18.

Another embodiment of the invention is shown with respect to FIGS. 4 and 5. In this embodiment an enclosure shown generally by the number 30, includes the identical elements of the previously described enclosure 10 with the exception of the protective member 18. An alternative protective member 32 is secured to the ends 34 of the layer 12 by the layer of hot melt adhesive 20.

The protective member 32 is an open mesh of polypropylene.

The protective member 32 has a height in cross-section which is at least twice the height of the cross-section of the heater 14. When the layer 12 shrinks, the protective member 32 acts as a mechanical standoff for preventing thermal and mechanical damage to the substrate. The height of the protective member serves to increase the thermal mass between the heater 14 and the substrate effectively lowering the temperature in that region.

With particular reference to FIG. 6, there is shown the enclosure 10 after shrinking of the layer 12 on the substrate 8. It will be appreciated that while enclosure 10 is shown, there would be no pictorial difference in FIG. 6 if enclosure 30 were shown.

EXAMPLE

A "slit heater" of the kind described in U.S. Pat. No. 1,177,446 was made by slitting a rectangular laminate consisting of a sheet 40 mils thick of a PTC conductive polymer sandwiched between two aluminum foils each 0.65 mil thick, and expanding it 4.5 times to give a heater 38.5 inch long and 18.5 inch wide, with 36 diamond-shaped apertures across its width. A copper bus bar was attached to one electrode along one side of the sheet and a second copper bus bar was attached to the other electrode along the other side of the sheet. Each bus bar was 0.3125 inch wide and 16 mil thick. Using a router equipped with a carbide tip, a channel was cut into the upper surface of the heater in the shape shown in FIG. 1, the "window" connection area thus created being about 13.5 inches high and about 18.5 inches wide, the top line of the window being about 4 inches from the top of the heater, and the bottom line of the window being about 1 inch from the bottom of the heater.

The heater was secured with a cured polyurethane adhesive to the inner surface of the layer 12. A 10 mil thick layer of hot melt adhesive was then applied over the heater. A 20 mil thick layer of cross-linked, unexpanded EVA was then secured to the slit heater and a 20 mil layer of hot melt adhesive was then applied over the protective member.

In the example, the material has an $\alpha$ of $0.7 \times 10^{-4}$ cm$^2$/sec.

While the instant invention has been described by reference to what is believed to be the most practical embodiments, it is understood that the invention may embody other specific forms not departing from the spirit of the invention. Specifically, the enclosure may employ the structure and principles of recently filed U.S. patent application to Chazan et al filed May, 1983 and commonly assigned to the assignee herein, Ser. No. 493,445. It should be understood that there are other embodiments which possess the qualities and characteristics which would generally function in the same manner and should be considered within the scope of this invention. The present embodiments therefore should be considered in all respects as illustrative and not limited to the details disclosed herein but are to be accorded the full scope of the claims, so as to embrace any and all equivalent apparatus and articles.

What we claim is:

1. A heat-shrinkable article, comprising:
   (1) a heat-shrinkable layer of polymeric material;

(2) a laminar heater which comprises:
  (a) two laminar apertured metal electrodes, one of the electrodes being on the inside of the article when it shrinks; and
  (b) a conductive polymer heating element between the electrodes; and
(3) a member for protecting a substrate from the laminar heater upon shrinking of the article against the substrate, which member,
  (a) is secured to the inside of the heater prior to shrinking the layer of polymeric material,
  (b) has a first shape before the article shrinks,
  (c) is deformed to a second shape when the article shrinks, and
  (d) possesses sufficient strength to resist piercing by the metal electrodes when the article shrinks,
whereby when the article is placed adjacent a substrate and the heater activated, the article shrinks against the substrate, and the member is deformed to its second shape for protecting the substrate from the heater.

2. An article according to claim 1, wherein the protective member (3) is secured to the heater (2) by hot melt adhesive.

3. An article according to claim 1, wherein the protective member (3) is made from a thermally insulating material.

4. An article according to claim 2, wherein the protective member (3) softens at the shrinking temperature of the layer (1).

5. An article according to claim 1, wherein the protective member (3) is made from cross-linked polymer.

6. An article according to claim 5, wherein the polymer is an ethylene/vinyl acetate copolymer.

7. An article according to claim 5, wherein the protective member is not heat-shrinkable.

8. An article according to claim 1, wherein the member deforms to a non-symmetrical second shape.

9. An article according to claim 1, wherein the protective member (3) deforms to a corrugated second shape.

10. An article according to claim 1, wherein there is a layer of heat-activatable sealing material between the protective member (3) and a substrate for sealing the substrate to the article after the layer (1) shrinks.

11. An article according to claim 10, wherein the sealing material comprises hot melt adhesive which is secured to the protective member (3).

12. An article according to claim 2, wherein the protective member (3) is made from a cross-linked, ethylene/vinyl acetate copolymer and is not heat-recoverable.

13. An article according to claim 10, wherein the sealing material comprises hot melt adhesive which is secured to the protective member (3).

14. An article according to claim 1, wherein the protective member (3) is in the form of an open mesh.

15. An article according to claim 1, wherein the protective member (3) is made from polypropylene.

16. An enclosure for a telephone cable splice, comprising an article according to claim 14 wherein the article has a first and a second end and wherein the protective member is in two parts, the first part applied to the first end and the second part applied to the second end.

17. A method of protecting a substrate, which comprises the steps of:
  A. placing a heat-shrinkable article adjacent the substrate, the article comprising:
    (1) a heat-shrinkable layer of polymeric material; and
    (2) a laminar heater secured to the inner surface of the layer, which heater comprises:
      (a) two laminar apertured metal electrodes, one of the electrodes being on the inside of the article when it shrinks; and
      (b) a conductive polymer heating element between the electrodes; and
  B. placing a member for protecting the substrate from the heater, between the heater and the substrate, which member,
    (a) has a first shape before the layer (1) shrinks,
    (b) is deformed to a second shape when the layer (1) shrinks,
    (c) possesses sufficient strength to resist piercing by the metal electrodes when the layer shrinks; and
    (d) is secured to the inside of the heater prior to shrinking the polymeric material; and
  C. activating the heater, and thus shrinking the article by supplying electrical power to the electrodes,
whereby, the article shrinks, and the member is deformed to its second shape, and protects the substrate from the heater.

18. A heat-shrinkable enclosure, comprising:
  (1) a heat-shrinkable layer of polymeric material;
  (2) a laminar heater which comprises:
    (a) two laminer apertured metal electrodes; one of the electrodes being on the inside of the article when it shrinks; and
    (b) a conductive polymer heating element between the electrodes; and
  (3) a nonrecoverable member for protecting a substrate from the laminer heater upon shrinking of the layer, which member,
    (a) is made from thermally insulating material,
    (b) has a first shape before the layer (1) shrinks,
    (c) is deformed to a second shape when the layer (1) shrinks,
    (d) possesses sufficient strength to resist piercing by the metal electrodes when the layer (1) shrinks, and
    (e) is secured to the inner side of the heater prior to shrinking the polymeric material,
whereby when the enclosure is placed around a substrate and the heater activated, the enclosure shrinks against the substrate, and the member is deformed to its second shape for protecting the substrate from the heater.

19. A method of protecting a substrate, which comprises the steps of:
  A. placing a heat-shrinkable enclosure around the substrate, the enclosure comprising:
    (1) a heat-shrinkable layer of polymeric material; and
    (2) a laminar heater comprises:
      a. two laminer apertured metal electrodes; one of the electrodes being on the inside of the article when it shrinks; and
      b. a conductive polymer heating element between the electrodes; and
    (3) a nonrecoverable member for protecting the substrate form the heater, between the heater and the substrate, which member,
      (a) is made from thermally insulating material,
      (b) has a first shape before the layer (1) shrinks,
      (c) is deformed to a second shape when the layer (1) shrinks, (d) possesses sufficient strength to resist piercing by the metal electrodes when the layer (1) shrinks, and (e) is secured to the inside of the heater prior to shrinking the polymeric material, B. activating the heater by supplying electrical power to the electrodes, whereby the enclosure shrinks, and the member is deformed to its second shape and protects the substrate from the heater.

20. An assembly made by the method of claim 19.

* * * * *